(12) United States Patent
Boyer et al.

(10) Patent No.: US 6,450,073 B1
(45) Date of Patent: Sep. 17, 2002

(54) BEARING FOR MULTI-SPINDLE BAR MACHINE

(76) Inventors: David M. Boyer, 109 S. Maple St., Simpsonville, SC (US) 29681; Ralph S. Hazen, Sr., 1154 Brims Grove Rd., Pinnacle, NC (US) 27043

( * ) Notice: Subject to any disclaimer, the term of this patent is extended or adjusted under 35 U.S.C. 154(b) by 23 days.

(21) Appl. No.: 09/643,618

(22) Filed: Aug. 22, 2000

(51) Int. Cl.$^7$ ............................ B23B 9/00; B23B 19/02
(52) U.S. Cl. ............................ 82/129; 82/145; 82/147
(58) Field of Search ................ 82/129, 147, 145, 82/146, 50, 71; 310/90, 90.5

(56) References Cited

U.S. PATENT DOCUMENTS

| | | |
|---|---|---|
| RE5,836 E | 4/1874 | Spencer |
| 1,081,916 A | 12/1913 | Sampson |
| 1,196,710 A | 8/1916 | Mattingly |
| 1,343,435 A | 6/1920 | Court |
| 1,674,453 A | 6/1928 | Sloper |
| 1,999,166 A | 4/1935 | Warlop ................ 308/121 |
| 2,046,991 A | 7/1936 | Zeller ................ 10/105 |
| 2,999,798 A | 9/1961 | Eital et al. ................ 204/34 |
| 3,711,171 A | 1/1973 | Orkin et al. ................ 308/241 |
| 4,576,488 A * | 3/1986 | Steiner et al. ................ 384/291 |
| 5,579,579 A * | 12/1996 | Chen ................ 29/898 |
| 5,716,141 A * | 2/1998 | Chen ................ 384/114 |
| 5,932,946 A * | 8/1999 | Miyasaka et al. ................ 310/90.5 |
| 6,023,114 A * | 2/2000 | Mori et al. ................ 310/90 |
| 6,307,293 B1 * | 10/2001 | Ichiyama ................ 310/90.5 |

* cited by examiner

Primary Examiner—Henry Tsai
(74) Attorney, Agent, or Firm—McNair Law Firm, P.A.

(57) ABSTRACT

A multi-spindle automatic bar machine having a housing, a plurality of spindles, each with a collet at one end, and mounted with a rotating head which is carried by said housing, said rotating head being adapted to index the spindles through a plurality of tooling stations. An improved machine bearing carried by the rotating head comprising a cylinder having a circular inner bearing surface carrying a spindle having a spindle bearing surface. Each cylinder bearing surface is formed with a pair of opposed spiral grooves each separated by a spiral flat. Each spiral groove is adopted to provide a passageway for lubricant through and over the entire machine bearing lubricating the each flat and the entire spindle bearing surface.

20 Claims, 2 Drawing Sheets

BEARING FOR MULTI-SPINDLE BAR MACHINE

BACKGROUND OF THE INVENTION

This instant invention is directed to a high speed bearing for use primarily in multi-spindle automatic bar machines.

As is well known, multi-spindle automatic bar machines are used to cut or machine any number machine parts into shape. An example of such parts are set screws, locking nuts, cap screws, hex head bolts, setting gears and many others. Because of space constraints and because of the fine tolerances required for maintaining the work end of the work carrying spindle, machined bearings are used to support the spindles for rotation. These bearings have two major drawbacks. First, they require break in time, which ranges between 120 hours to 240 hours, during which the machine is run at a fraction of its normal operating speed. Secondly, they wear out after running only about eight months.

It is therefore a primary object of the instant invention to provide machine bearings for multi-spindle automatic bar machine which do not require a break-in period.

The second primary object of this invention is to provide machine bearings for multi-spindle automatic bar machines which provide a much extended life span.

Another object of the invention is a high speed bearing with superior lubricating ability.

Another object of the invention is a high speed bearing in which one of the bearing cylinder and the bearing spindles is coated with a self-lubricant.

Another object of the invention is a high speed bearing having a continuous and replenishing lubricating system over the entire bearing surface.

SUMMARY OF THE INVENTION

The instant invention is directed primarily to a multi-spindle automatic bar machine which includes a housing, a plurality of spindles each having a collet at one end, and each mounted on a rotating head carried by the housing. The rotating head is adapted to rotate the spindles through a plurality of tooling stations where various industrial elements are cut to shape.

Each spindle is formed with a bearing surface about its periphery which is supported by the rotating head. The rotating head is formed with a plurality of machine bearings about its circumference in which each of the spindle bearings are carried. Each machine bearing comprises a cylinder having a circular inner bearing surface which engages with the respective spindle bearing surface. The cylinder bearing surface is formed with a spiral groove which is separated by a spiral flat. The spiral groove, which extends across the entire cylinder bearing surface, is adapted to provide a passageway for lubricant to be delivered over the entire bearing surface.

The cylinder bearing is formed of bronze or iron, while the spindle bering surface is made of medium or high carbon steel. It is preferred that the spindle is coated with a composite coating of tungsten carbide and carbon.

The cylinder bearing includes an outer circumferential groove overlaying an inner circumferential groove and at least one hole passing through the cylinder interconnecting with the inner and outer circumferential grooves. The hole along with the inner and outer circumferential grooves provide passageways for lubricant into the cylinder. The spiral groove intersects with the hole or the inner circular groove, or both.

The spiral groove comprises a first spiral groove which spirals in a first direction and a second spiral groove which spirals in a second direction opposite to the first direction. The first and second spiral grooves extend through opposite ends of the cylinder. The first and second spiral grooves begin substantially centrally of the cylinder bearing interconnecting with the circular groove about the inner surface of the cylinder.

A high speed bearing comprising a spindle bearing surface formed about a spindle and a cylinder bearing having an inner bearing surface adapted to fit over the spindle bearing surface. A spiral groove is arranged about the cylinder bearing surface forming a flat there between. The spiral groove extends the length of the cylinder and terminates through its end surfaces. A lubricant supply arrangement is provided for supplying lubricant to the spiral groove. This structure provides that rotation of the spindle causes the spindle bearing surface to move against the flat and over the spiral groove of the cylinder bearing surface pushing the lubricant through the spiral groove and carrying it over and across the flat of the spindle bearing surface. The spiral groove may comprises a first and a second spiral groove with the first spiral groove spiraling in a first direction and the second spiral groove spiraling in a second direction opposite to the first direction. The first and second spiral grooves begin substantially centrally of the bearing surface where a lubricant supply is located. Rotation of the spindle bearing acts to assist in moving the lubricant over the flat, through the first and second spiral grooves and out the end surfaces of the cylinder.

The first and second spiral grooves are cut to about seven threads per inch and to about 0.030 inch R and 0.025 inch in depth.

DESCRIPTION OF A PREFERRED EMBODIMENT

Figure 1:
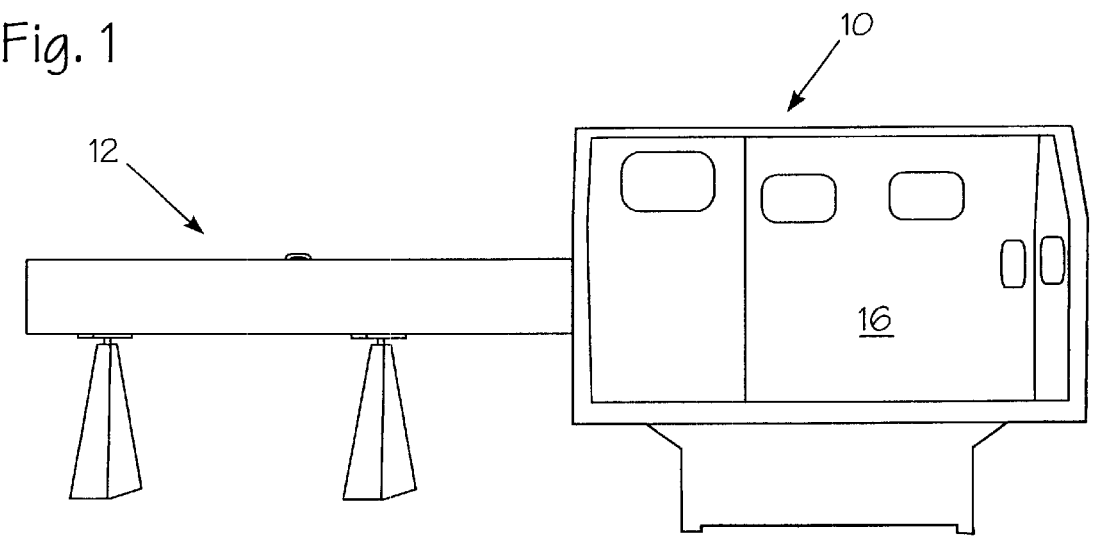
FIG. 1 is a side view of a multi-spindle automatic bar machine.
Figure 2:
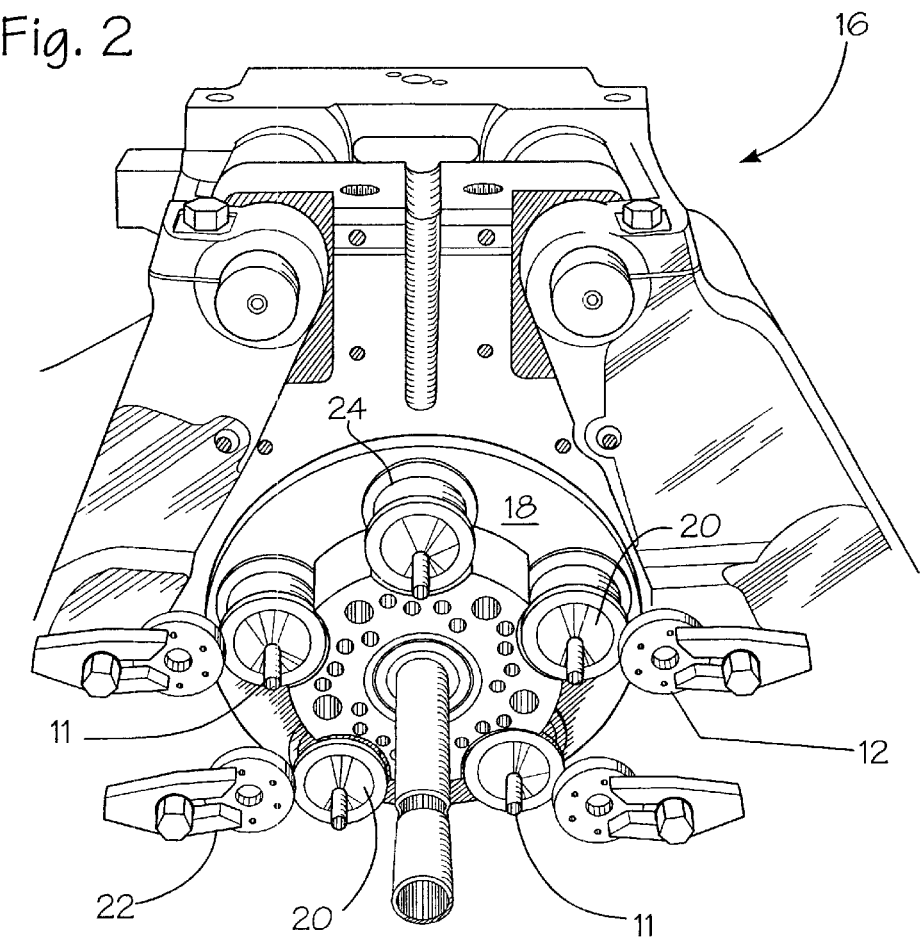
FIG. 2 is a perspective front view of the machining end of an automatic bar machine.
Figure 3:
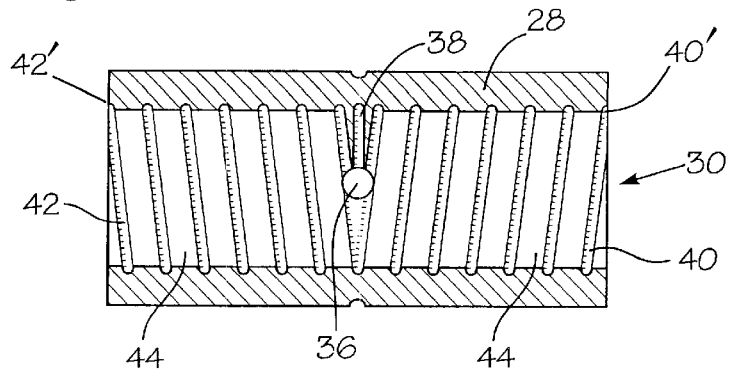
FIG. 3 is a sectional side view of a machine bearing cylinder for use with a machine as shown in FIGS. 1 and 2.
Figure 4:
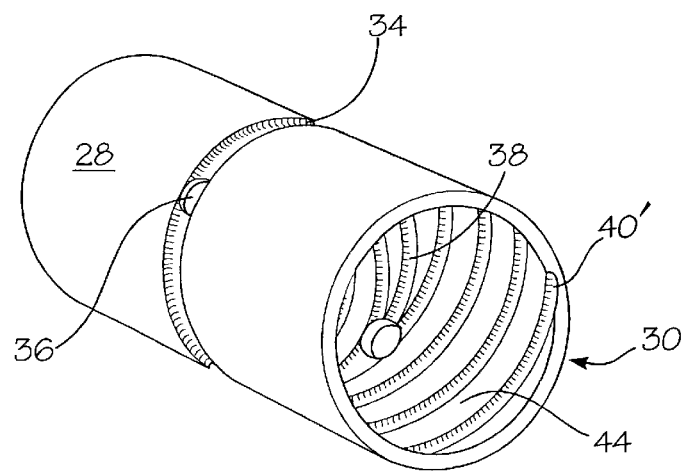
FIG. 4 is a perspective view of the cylinder of FIG. 3.
Figure 5:
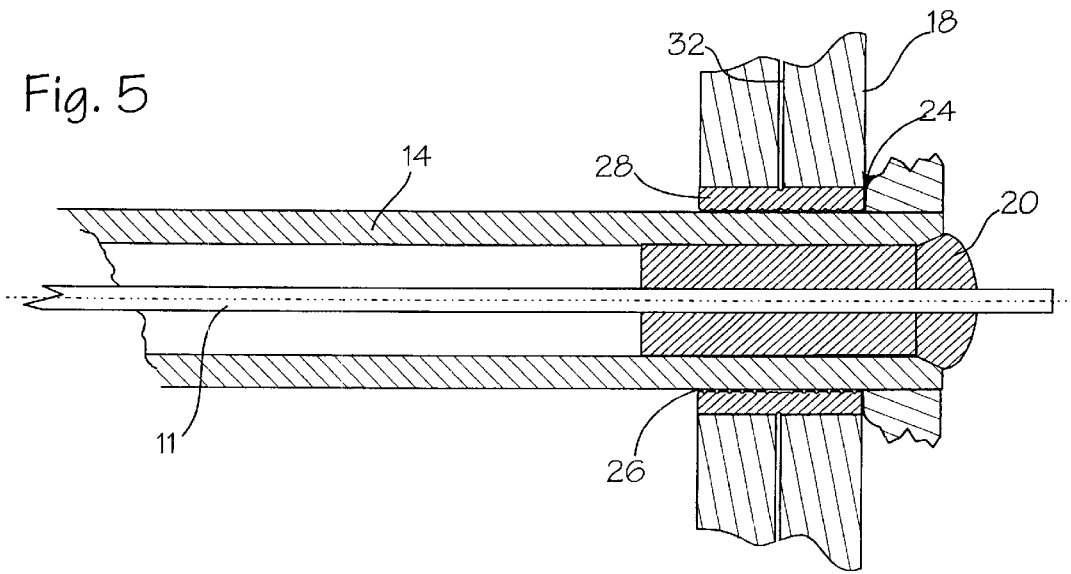
FIG. 5 is a sectional cutaway side view of the machine bearing formed by the spindle bearing surface engaged in the machine bearing.

Turning now to the drawings, FIG. 1 depicts a standard multi-spindle automatic machine 10 as is now used throughout the industry for machining machine parts such as turning shafts, toggle switch handles. various electrical connectors, dental instruments, various fittings, set screws, nuts, hex-head bolts, faucet components, etc. Generally, the forming product comprises a metal rod 11 for each head. The rods are fed from the supply end 12 through a respective spindle 14 to the housing or machine head 16. As is usual, each spindle 14 is carried at its work end by an indexing or rotating head 18, as best seen in FIG. 2. Arranged at the work end of each spindle 14 is the usual collet 20 which acts to grip and hold the associated metal rod 11 during machining. Arranged about indexing or rotating head 18 are a plurality of work stations which comprise cutting tools 22, or other appropriate forming instruments.

Arranged about the periphery of indexing or rotating head 18 are a plurality of machine bearings 24. Each machine bearing 24 comprises a cylinder 28, the inner surface of which forms a cylinder bearing surface 30. Each spindle 14 has a bearing surface 26 formed about its periphery and positioned within cylinder 28 forming the machine bearings 24.

Rotating head 18 is formed with a plurality lubricant or oil supply lines 32 which communicate with an oil supply stored within machine head 16. Oil is supplied through supply lines 32 to each of the machine bearings 24 in the usual manner. It should be noted that the oil delivered to the machine bearings 24 and the cutting tools 22 may be from the same supply pool or is at least returned to a common supply pool which is at the lower area of machine head 16 and which is also used to lubricate the cutting heads. Because of this, relatively dense oils are required.

Normally, spindles 14 are made of medium to high carbon steel as is also the spindle bearing surface 26. Also, normally cylinder 28 is formed of bronze or iron.

Thus far the structure described is old and is normally present in the multi-spindle bar machines on the market today, such as the Davenport machine manufactured by Davenport Industries of Rochester, N.Y.

As earlier stated, the primary drawback with these machines is that the machine bearings are metal on metal and operate at very fine tolerances in order that the machining may be precise. Yet, these machines must operate at high speed or RPM's, i.e. about 3000 RPM's, in order to be economical. Running at this speed, the bearings described have a run time of between six and ten months, at which time they begin to wear which sets up vibrations and must be replaced.

The replacement down time is compounded by the required break in period required for the new bearings which ranges between 120 hours and 240 hours. During this break in period the machine must be run at lower RPM's, as low as 500 RPM, and constantly monitored until a constant operating temperature of about 120 degrees is achieved.

The instant invention, in all tests conducted to date, eliminates the break in time and more than doubles the run time.

Primarily, the invention consists of two modifications. First, spindle 14 and particularly spindle bearing surface 26 is coated a tungsten carbide/carbon coating. The coating is preferably applied in alternating layers of amorphous carbon and tungsten carbide particles to a surface finish of 4–5 rms. It has been found that in use the coating on spindle 14 will rub or migrate onto the bearing surface 30 of cylinder 28 providing mating surfaces which resist wear, scuffing, galling and seizure.

It is noted that the surface finish may be varied between rms found to be suitable.

The second and possibly the more significant of the modifications concerns cylinder 28.

Cylinder 28 is formed with an outer circular groove 34 which is aligned with oil supply line 32 when the cylinder is positioned within rotating head 18. Formed in circular groove 34 is preferably a pair of supply holes 36. These holes are normally in opposed positions about the periphery of the cylinder. Formed on the inner side of cylinder 28 is a second inner circular groove 38. Inner groove 38 is arranged beneath outer groove 34 and also is penetrated by holes 36. Arranged on one side of and communicating with inner groove 38 is spiral groove 40 which continues in a first direction along the inner surface of cylinder 28 through the end thereof at 40'. A second spiral groove 42 begins communicating with the opposite side of inner groove 38 and spirals in a second direction opposite the direction of spiral of groove 40 through the opposite end of cylinder 28 at 42'. It is noted that grooves 40 and 42 may connect with inner groove 38 adjacent hole 36 or between holes 36. Also, it is possible that only one spiral groove be formed so long as it penetrates through each end of the cylinder and is provided with oil along its entire length.

Preferably all groves are cut to be at least 0.030"R and 0.025" depth. These limits may vary by 0.015". Also, it is preferred that spiral grooves 40 and 42 be cut between three and fourteen threads per inch with seven being preferred.

Between each groove 40 and 42 a flat 44 is formed which extends to the opposite ends of cylinders 28.

Installed with the rotating head, each cylinder 28 has its outer circular cavity aligned with an oil supply line 32. Spindle bearing surface 26 is located within and against cylinder bearing surface 30 and is supported on flats 44. There is a constant clearance between these surfaces of only 0.0013" to 0.0011", preferably closer to the latter. Lubricant, normally oil, is supplied through lines 32 into grooves 34 where it moves about cylinder 28 and through holes 36. Once through the holes the oil moves about groove 38 and into spiral grooves 40, 42. As it passes along the spiral of grooves 40, 42, it is exposed at some point to the entire circumference of cylinder 28 along its entire length. The oil continues along each spiral groove until it reaches the opposing ends of the cylinder 28 where it passes out of the bearing and is redeposited with the oil supply.

It is noted that spiral grooves 40, 42 are not necessarily of constant size along their entire length. It may be desirable to alter the size of each spiral groove adjacent its exit point from cylinder 28 in order to adjust the bleed of flow rate.

Spindle bearing surface 26, carried within cylinder 28, is contacted along its entire length at some point by the lubricant in grooves 40, 42. As spindle 14 rotates, its oil exposed bearing surface areas pick up and carry or smear the oil over the supporting surface of the flats. Excess oil is simply redeposited in the groove as the shaft rotates. This prevents the oil coating the spindle bearing surface and the flat surface from overheating. Also, as spindle 14 rotates it acts to push, or urge, or convey the oil through the spiral grooves and out through the openings at 40' and 42' which also prevents overheating and maintains the oil supply within the spiral grooves fresh.

Tests have been conducted on machines within operating facilities. In those tests there was no break in period required. The machines with the just installed bearings of the invention were immediately brought up to speed with no excessive heat build up. They have been run continuously at 3000 RPM for over a month with no significant heat build up and no siezures.

While a preferred embodiment of the invention has been described using specific terms, such description is for illustrative purposes only, and it is to be understood that changes and variations may be made without departing from the spirit or scope of the following claims.

What is claimed is:

1. A multi-spindle automatic bar machine having a housing, a plurality of spindles, each with a collet at one end and mounted with a rotating head which is carried by said housing, said rotating head being adapted to rotate said spindles through a plurality of tooling stations, the improvement comprising:

each said spindle, having a bearing surface about its periphery adjacent said one end;

said rotating head having a plurality of cylinders forming bearings located about its circumference and a supply line to each said cylinder, each said cylinder having a circular inner bearing surface which engages with a respective of said spindle bearing surfaces forming a machine bearing; and, said cylinder bearing surface having a spiral groove separated by a spiral flat with said spiral groove being adapted to provide a passageway for lubricant, supplied through said supply lines, over said entire machine bearing lubricating the entire surface of said flat and said flat engaging spindle bearing surface.

2. The machine of claim 1 wherein each said cylinder is formed of one of bronze and iron.

3. The machine of claim 1 wherein said spindle bearing surface is made of one of medium and high carbon steel.

4. The machine of claim 1 wherein said spindle is coated with a composite coating of tungsten carbide and carbon.

5. The machine of claim 1 wherein said cylinder bearing includes an outer circumferential groove overlaying an inner circumferential groove and at least one hole passing through said cylinder and interconnecting said inner and outer circumferential grooves, said hole along with said inner and outer circumferential grooves providing passage ways for lubricant into said cylinder.

6. The machine of claim 5 wherein said spiral groove intersects with at least one of said at least one hole and said inner circular groove.

7. The machine of claim 1 wherein said spiral groove comprises a first spiral groove which spirals in a first direction and a second spiral groove which spirals in a second direction opposite to said first direction, said first and second spiral grooves exiting opposite ends of said cylinder.

8. The machine of claim 6 wherein said first and second spiral grooves begin substantially centrally of said cylinder.

9. The machine of claim 8 wherein said cylinder includes a circular groove about its bearing surface, said circular groove intersecting with inner ends of said first and second spiral grooves.

10. The machine of claim 9 including an oil supply opening through said cylinder intersecting with said circular groove; wherein, oil is supplied over the entire bearing surfaces of said machine bearing.

11. A high speed bearing comprising:

a spindle bearing surface formed about a spindle;

a bearing cylinder having an outer surface and an inner bearing surface adapted to fit over said spindle bearing surface forming a machine bearing;

a spiral groove arranged about said cylinder bearing surface forming a flat between spirals of said spiral groove, said spiral groove extending the length of said cylinder terminating through opposing end surfaces thereof;

a lubricant supply arrangement including a circular supply groove formed in said outer surface and extending about the circumference of said cylinder and an opening formed in said supply groove connecting said supply groove with said bearing surface supplying lubricant to said spiral groove; whereby, rotation of said spindle causes said spindle bearing surface to rotate against said flat and over said spiral groove causing said lubricant to move about said circular groove, through said opening about said spiral groove, about said spindle bearing surface and over said flat.

12. The bearing of claim 11 wherein said spiral groove comprises a first and a second'spiral groove, said first spiral groove spiraling in a first direction and said second spiral groove spiraling in a second direction opposite to said first direction, each of said first and second spiral grooves forming respectively a first and second flat there between.

13. The bearing of claim 12 wherein said first and second spiral grooves laid begin substantially centrally of said bearing surface.

14. The bearing of claim 13 including a circular groove formed in said bearing surface connecting with said opening and inner ends of said first and second spiral grooves, said circular groove acting as a lubricant supply conduit.

15. The bearing of claim 14 including a lubricant supply external of said cylinder supplying lubricant to said lubricant supply conduit.

16. The bearing of claim 12 wherein said first and second spiral grooves are cut to about seven threads per inch.

17. The bearing of claim 12 wherein said first and second spiral grooves are about 0.030 inch R×0.025 inch depth.

18. The bearing of claim 12 wherein said first and second spiral grooves are cut at seven threads per inch.

19. The high speed machine of claim 11 wherein said spiral groove adjacent said end surfaces is of a different size than said spiral groove throughout the remainder of said cylinder.

20. A high speed machine bearing comprising:

a spindle bearing surface formed about a spindle, said spindle bearing surface being coated with a composite coating of tungsten carbide and carbon;

a bearing cylinder having an outer surface and an inner bearing surface adapted to fit over said spindle bearing surface forming said machine bearing;

at least one circular groove formed about said outer surface;

at least one spiral groove arranged about said cylinder bearing surface forming a flat between the spiral of said at least one spiral groove, said at least one spiral groove extending over substantially the length of said cylinder;

at least one opening formed in said circular groove communicating said circular groove with said spiral groove;

a lubricant supply located externally of said bearing supplying lubricant through said opening to said at least one spiral groove; whereby, rotation of said spindle causes said spindle bearing surface to rotate against said flat and over said spiral groove causing said lubricant and said coating to migrate onto and to coat said flat.

* * * * *